United States Patent
Gildfind (10) Patent No.: US 9,285,950 B2
(45) Date of Patent: *Mar. 15, 2016

(54) HOVER-OVER GESTURING ON MOBILE DEVICES

(75) Inventor: Andrew Gildfind, London (GB)

(73) Assignee: Google Inc., Mountain View, CA (US)

( * ) Notice: Subject to any disclaimer, the term of this patent is extended or adjusted under 35 U.S.C. 154(b) by 1261 days.

This patent is subject to a terminal disclaimer.

(21) Appl. No.: 13/075,434

(22) Filed: Mar. 30, 2011

(65) Prior Publication Data

US 2012/0254808 A1 Oct. 4, 2012

(51) Int. Cl.
*G06F 3/0488* (2013.01)
*G06F 3/0481* (2013.01)

(52) U.S. Cl.
CPC ........ *G06F 3/04812* (2013.01); *G06F 3/04883* (2013.01); *G06F 3/04886* (2013.01); *G06F 2203/04808* (2013.01)

(58) Field of Classification Search
CPC .............. G06F 3/04883; G06F 2203/04807; G06F 3/0488; G06F 3/0481; G06F 3/04886
See application file for complete search history.

(56) References Cited

U.S. PATENT DOCUMENTS

| | | | |
|---|---|---|---|
| 6,856,259 | B1 | 2/2005 | Sharp |
| 6,938,221 | B2 | 8/2005 | Nguyen |
| 7,653,883 | B2 | 1/2010 | Hotelling et al. |
| 2002/0015064 | A1 | 2/2002 | Robotham et al. |
| 2002/0057263 | A1 | 5/2002 | Keely et al. |
| 2002/0152288 | A1 | 10/2002 | Hora et al. |
| 2002/0191029 | A1 | 12/2002 | Gillespie et al. |
| 2004/0150668 | A1 | 8/2004 | Myers et al. |
| 2006/0267966 | A1 | 11/2006 | Grossman et al. |
| 2007/0262951 | A1 | 11/2007 | Huie et al. |
| 2008/0059888 | A1 | 3/2008 | Dunko |
| 2008/0163119 | A1 | 7/2008 | Kim et al. |
| 2008/0165141 | A1 | 7/2008 | Christie |
| 2008/0168403 | A1* | 7/2008 | Westerman et al. .......... 715/863 |
| 2010/0013796 | A1 | 1/2010 | Abileah et al. |
| 2010/0105443 | A1 | 4/2010 | Vaisanen |
| 2010/0107067 | A1 | 4/2010 | Vaisanen |
| 2012/0050211 | A1* | 3/2012 | King et al. .................... 345/174 |

OTHER PUBLICATIONS

Roggio, "Capacitive Touchscreen Solution Senses Hovering," published online at Hearst Electronic Products [online]. Article posted on Jun. 1, 2010. First Accessed on Oct. 7, 2010. Retrieved from the Internet<http://www.semiapps.com/Capacitive_Touchscreen_Solution_Senses_Hovering.aspx> (3 pgs.).

Press release, "Cypress's New Hover Detection for TrueTouch™ Touchscreen Solution Indicates Where a Finger Will Touch as It Approaches Screen," Cypress Perform [online]. Cypress Semiconductor Corporation, 2011. Press Release last updated on Apr. 20, 2010. First Accessed on Oct. 7, 2010. Retrieved from the Internet<http://www.cypress.com/?rID=42779> (2 pgs.).

(Continued)

*Primary Examiner* — Namitha Pillai
(74) *Attorney, Agent, or Firm* — Shumaker & Sieffert, P.A.

(57) ABSTRACT

Aspects of the disclosure may relate to detecting, by a computing device, a first user input comprising a first gesture to interact with a touch-sensitive screen of the computing device. Aspects may also include detecting a second user input comprising a second gesture using the touch-sensitive screen of the computing device. Aspects may also include, responsive to detecting the first user input, initiating a hover mode of interaction in a graphical user interface.

17 Claims, 6 Drawing Sheets

(56) References Cited

OTHER PUBLICATIONS

Office Action from U.S. Appl. No. 13/249,677, dated Nov. 25, 2011, 16 pgs.

Response to Office Action dated Nov. 25, 2011, from U.S. Appl. No. 13/249,677, filed Feb. 24, 2012, 10 pp.

Notice of Allowance from U.S. Appl. No. 13/249,677, dated Apr. 2, 2012, 15 pp.

* cited by examiner

HOVER-OVER GESTURING ON MOBILE DEVICES

TECHNICAL FIELD

The disclosure relates to touch based user inferences.

BACKGROUND

Electronic devices, such as computers, mobile phones, personal media players (PMP), gaming consoles, or other electronic devices typically require a user interface for a user to interact with the devices. Touch-sensitive screens ("touch screens") are one type of user interface that allows a user to interact with the device by physically making contact with the device. In one example, a user may touch the screen of a mobile device to initiate execution of an application stored on the mobile device. Some techniques employed in these devices for detecting the location of a touch include mechanical buttons, crossed beams of infra red light, acoustic surface waves, capacitive sensing, and resistive sensing techniques.

Certain touch screens may be designed to simultaneously recognize touches at more than one point on the screen, a feature commonly referred to as "multi-touch." Multi-touch screens separately identify and interpret touches in different areas of the screen. Simultaneously touching a multi-touch screen in more than one location may provide a user with additional ways to interact with the device (e.g., versus a single touch).

SUMMARY

In general, aspects of the disclosure relate to techniques for supporting interaction between a user and a device having a touch-sensitive screen ("touch screen"). In some examples, aspects of the disclosure relate to providing a "hover" or "hovering" style interaction mode for device having a touch screen. For example, a hover mode may allow a user to interact with a user interface (UI) element displayed on a device without activating the UI element. Some examples of hover functions include highlighting or otherwise changing text of the UI element to notify a user that the element can be actuated, initializing a preview window that includes content associated with the UI element, initializing new content, such as a "tool tip" window to be displayed.

In one example, aspects of the disclosure are directed to a method that includes detecting, by a computing device, a first user input comprising a first gesture to interact with a touch-sensitive screen of the computing device. The method also includes detecting, by the computing device, a second user input comprising a second gesture to interact with the touch-sensitive screen of the computing device, wherein the second user input is distinct from the first user input. The method also includes, responsive to detecting the first user input, initiating a hover mode of interaction in a graphical user interface displayed by the touch-sensitive screen of the computing device, wherein the hover mode of interaction allows a user to trigger a graphical interaction with at least one user interface element in the graphical user interface using the second user input, wherein the graphical interaction comprises providing graphical information associated with the at least one user interface element without activating the at least one user interface element in the graphical user interface.

In another example, aspects of the disclosure are directed to computer-readable storage medium encoded with instructions for causing one or more programmable processors of a computing device to perform operations including detecting, by a computing device, a first user input comprising a first gesture to interact with a touch-sensitive screen of the computing device. The operations also include detecting, by the computing device, a second user input comprising a second gesture to interact with the touch-sensitive screen of the computing device, wherein the second user input is distinct from the first user input. The operations also include, responsive to detecting the first user input, initiating a hover mode of interaction in a graphical user interface displayed by the touch-sensitive screen of the computing device, wherein the hover mode of interaction allows a user to trigger a graphical interaction with at least one user interface element in the graphical user interface using the second user input, wherein the graphical interaction comprises providing graphical information associated with the at least one user interface element without actuating the at least one user interface element in the graphical user interface.

In another example, aspects of the disclosure are directed to a computing device that includes one or more processors and a user interface having a touch-sensitive screen. The computing device also includes a means for detecting a first user input and a second user input distinct from the first user input, wherein the first user input comprises a first gesture to interact with the touch-sensitive screen, and wherein the second user input comprises a second gesture to interact with the touch-sensitive screen. The one or more processors are configured to initiate, in response to detecting the first user input, a hover mode of interaction in a graphical user interface displayed by the touch-sensitive screen of the computing device, wherein the hover mode of interaction allows a user to trigger a user interaction with at least one user interface element in the graphical user interface using the second user input, wherein the graphical interaction comprises providing graphical information associated with the at least one user interface element without actuating the at least one user interface element in the graphical user interface.

The details of one or more aspects of the disclosure are set forth in the accompanying drawings and the description below. Other features, objects, and advantages of the disclosure will be apparent from the description and drawings, and from the claims.

DETAILED DESCRIPTION

In general, aspects of the disclosure relate to techniques for supporting interaction between a user and a device having a touch-sensitive screen ("touch screen"). In some examples, aspects of the disclosure relate to providing a "mouse over" or "hovering" style interaction mode for device having a touch screen. A "hover" interaction mode is commonly available in non-touch, desktop computing platforms. For example, a "hover" mode may be initiated when a user moves a mouse cursor over an interactive user interface (UI) element (e.g., a button, hypertext, etc.) without actuating the UI element. The presence of the cursor in the vicinity of the UI element triggers a UI event that provides additional information about the UI element without activating the UI element. As used herein, the terms "hover function" and "hover content" refer generally to an interactive aspect of a UI element, and may be used interchangeably. Some examples of hover functions include visually highlighting or otherwise changing text of the UI element to notify a user that the element can be actuated, initializing a preview window that includes content associated with the UI element, or initializing new content, such as a "tool tip" window to be displayed.

By convention, a user's touch-based contact with a touch screen is typically interpreted as a touch down or tap event (e.g., equivalent to actuating or "clicking" a mouse button on conventional personal computers, or PC's) or a scroll event (e.g., equivalent to using a scroll wheel of a mouse to scroll through content on conventional PC's). According to one or more aspects of the disclosure, a UI is configured to recognize a first user input, such as a touch in a predefined location of a touch screen UI. The first input is used to hold in position, or "pin" a rendered image on the touch screen display. The first input may also be used to disable touch down/tap events. The UI is also configured to recognize a second user input, such as an additional touch that is independent from the first touch. The second user input may be used to implement a "hover" interaction mode function. For example, the second user input triggers an interaction with a UI element without selecting or initiating the function of the UI element. In some examples, the first user input is a continuous user input, during which the user maintains contact with the touch screen while completing the second user input.

According to some aspects of the disclosure, the first user input may be recognized in a specific, predefined location of the touch screen. The predefined location may be, but is not limited to, an area in the lower left corner or lower right corner of the touch screen. The first user input may switch a mode of interaction with the UI, such that the second user input registers with the UI as a "hover" interaction, rather than a scroll or tap interaction. In some examples, the user is notified that the mode of interaction has changed (e.g., a traditional arrow style mouse cursor may be displayed on the screen). Additionally, the hover event associated with the second user input may be translated a distance on the UI from the physical location of the second gesture. For example, the hover event (e.g., a preview window or other hover content) may be presented a certain distance above, below, or to the side of the physical location of the second user input. The UI may also include an ability to "snap" the hover event to the perceptually closest UI element.

The first user input may be used to emulate a user "pinning" or holding a moving web page so that the second user input does not alter or move the content of the web page. In this way, the user is free to investigate the UI elements on a web page, without altering the contents of the underlying web page. The location of the first user input can be chosen according to ergonomic considerations. For example, a thumb of a user may naturally be positioned in the lower left or lower right corners of a touch screen, for example, when holding a mobile device such as a mobile phone, tablet computer, or other portable computing device. Other locations of the screen, however, can also be designated for the first user input. In some examples, the location designated for the first user input may change according to the physical orientation of the device.

Accordingly, aspects of the disclosure generally relate to a gestural interaction that includes a first user input in a known location, which causes a second user input to be interpreted as a "hover" or "hover" event. The location and heuristic of the first user input may be based on ergonomic considerations or normal patterns of use. In addition, the first user input may be detected in the presence of other multi-touch interactions (such as a "pinch-to-zoom" gesture).

Certain aspects of the disclosure refer to a "first" user input in a known location of a UI that initiates a mode of interaction allowing a "second" user input to be interpreted as a "hover" event. It should be understood, however, that aspects of the disclosure generally relate to enabling a mode of interaction in a UI that allows a user to trigger an interaction with a UI element, without selecting or activating the function of the UI element, via two distinct user inputs. The user may provide the distinct user inputs in any order. For example, the user may provide user input to enable the mode of interaction and provide user input to interact with a UI element in any order. In addition, the order in which the user provides the user input may affect the user's interaction with the computing device.

For example, aspects of the disclosure relate to at least four non-limiting examples of interactions between a user and a computing device in which the user provides "first" and "second" user inputs in the form of maintained contact with a touch screen UI. In a first example, a user may provide a first user input on the UI to interact with a UI element. The user may also provide a second user input in a predefined location of a UI that initiates a "hover" mode of interaction. Initiating the "hover" mode of interaction with the second user input allows the user to pin the UI and interact with, or explore, a UI element without selecting or initiating the function of the UI element. The user may then release the first user input (e.g., break contact with UI) and release the second user input.

In a second example, the user may provide a first user input on the UI to interact with a UI element. The user may also provide a second user input in a predefined location of a UI that initiates a "hover" mode of interaction. Initiating the "hover" mode of interaction with the second user input allows the user to pin the UI and interact with, or explore, a UI element without selecting or initiating the function of the UI element. The user may then release the second user input. Upon release of the second user input, the UI may "activate" the UI element associated with the first user input. For example, "activating" a UI element may refer to selecting the element with a "mouse down event" (e.g., typically associated with clicking a mouse button using a conventional PC) such that the content associated with a mouse down event is triggered. Upon activating the UI element, user may then release the first user input.

In a third example, a user may provide a first user input in a predefined location of the UI to activate a "hover" mode of interaction and pin the UI. The user may then provide a second user input on a UI element to interact with, or explore, a UI element without selecting or activating the function of the UI element. The user may then release the second user input to stop interacting with the UI element, as well as release the first user input to disable the "hover" mode of interaction.

In a fourth example, a user may provide a first user input in a predefined location of the UI to activate a "hover" mode of interaction and pin the UI. The user may then provide a second user input on a UI element to interact with, or explore, a UI element without selecting or activating the function of the UI element. The user may then release the first user input to disable the "hover" mode of interaction. Upon releasing the first user input and disabling the "hover" mode of interaction, the UI may "activate" the UI element associated with the second user input, such that the content associated with a mouse down event is triggered. The user may then release the second user input.

Figure 1:
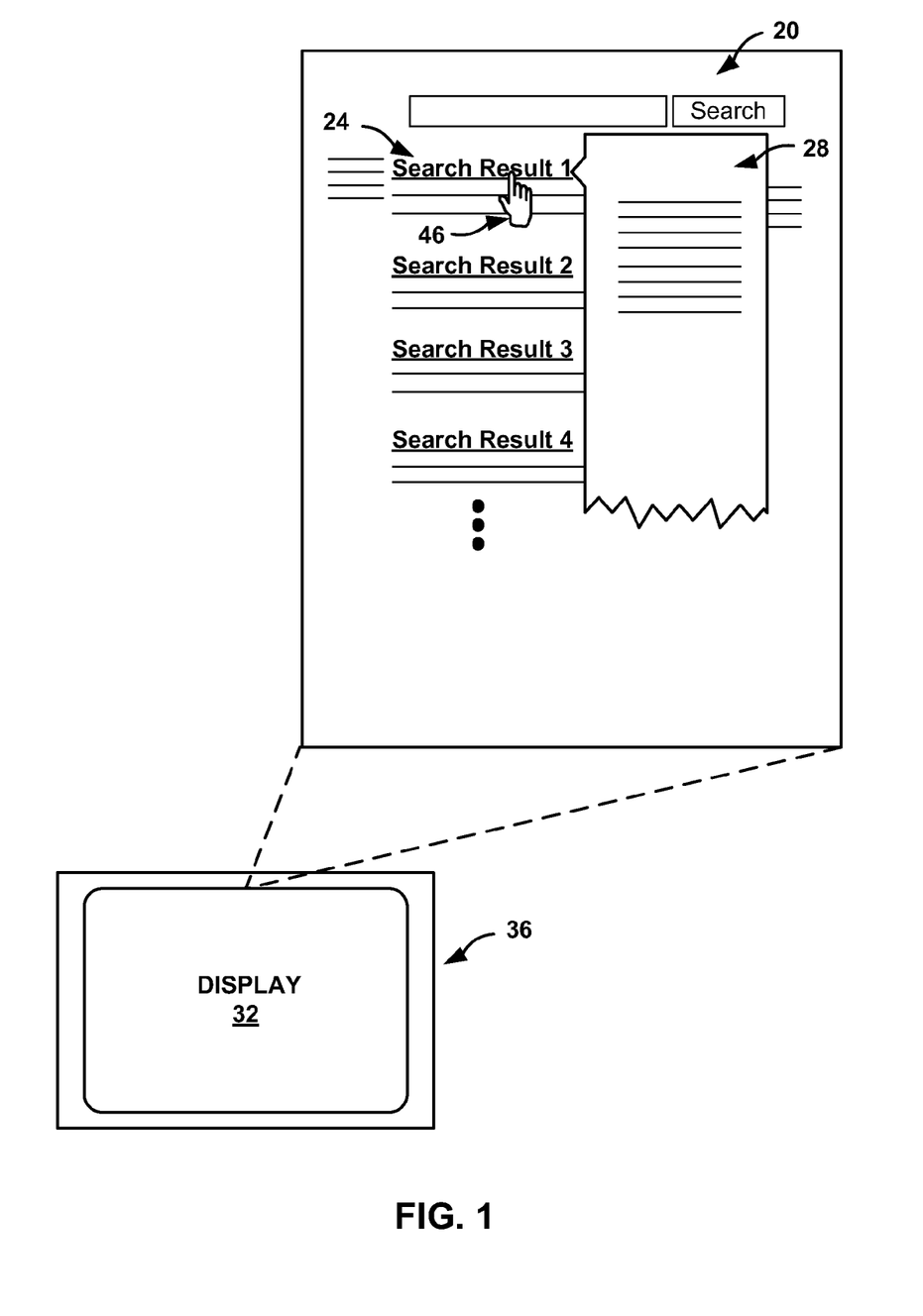
FIG. 1 is a diagram illustrating an example graphical user interface having a user interface element that includes associated hover content, according to one or more aspects of the present disclosure.

FIG. 1 is a diagram illustrating an example graphical user interface (UI) 20 having a UI element 24 that includes associated hover content 28. According to some aspects of the disclosure, the UI 20 may be displayed on a display 32 of a computing device 36 having a user input device 40. While the example FIG. 1 shows UI 20 as a search engine associated with a web page, other UIs 20 having a variety of other UI elements may also be displayed on display 32.

Computing device 36 may, in some examples, include or be a part of a portable computing device (e.g. mobile phone, netbook, laptop, tablet device, or other portable computing device) or a non-portable device such as a desktop computer. In some examples, the user input device may include pointing devices such as a mouse, a trackball, a joystick, a keypad, or other tactile input devices.

In the example shown in FIG. 1, a user can navigate UI 20 with a cursor 46, which is controlled using the user input device. Accordingly, the user can select UI element 24 by using the input device such that cursor 46 is moved to the appropriate location on display 32. Selecting UI element 24 may cause content displayed on display 32 to change according to content associated with UI element 24. For example, selecting a hyperlink UI element 24 may cause a web page associated with the hyperlink to be displayed on display 32.

According to some aspects of the disclosure, computing device 36 and UI 20 may be configured to display hover content 28 on display 32. A hover mode of interaction may be initiated for displaying hover content 28 by a user when the user moves cursor 46 to UI element 24 with the input device without activating UI element 24 with the input device. For example, as used herein, "activating" a UI element may refer to selecting the element with a "mouse down event" (e.g., typically associated with clicking a mouse button using a conventional PC) such that the content associated with a mouse down event is triggered. In one non-limiting example, "activating" a hyperlink UI element on a web page may cause the computing device 36 to navigate to the web page associated with the hyperlink UI element.

As shown in FIG. 1, the presence of cursor 46 in the vicinity of the UI element 24 triggers a UI event that provides additional information about the UI element without activating the UI element. An example of a hover function includes highlighting or otherwise changing text of UI element 24 to notify the user that UI element 24 can be activated (e.g., UI element 24 includes content that can be triggered by clicking a mouse button using a conventional PC or touching a touch screen). In another example, a hover function may include displaying text that describes content associated with UI element 24 (e.g., hover content associated with an application icon may provide information about the application). In another example, a hover function may include initializing a preview window that includes content associated with the UI element 24 (e.g., hover content associated with a web page hyperlink may provide a preview window that includes the content of the web page associated with the hyperlink).

Figure 2:
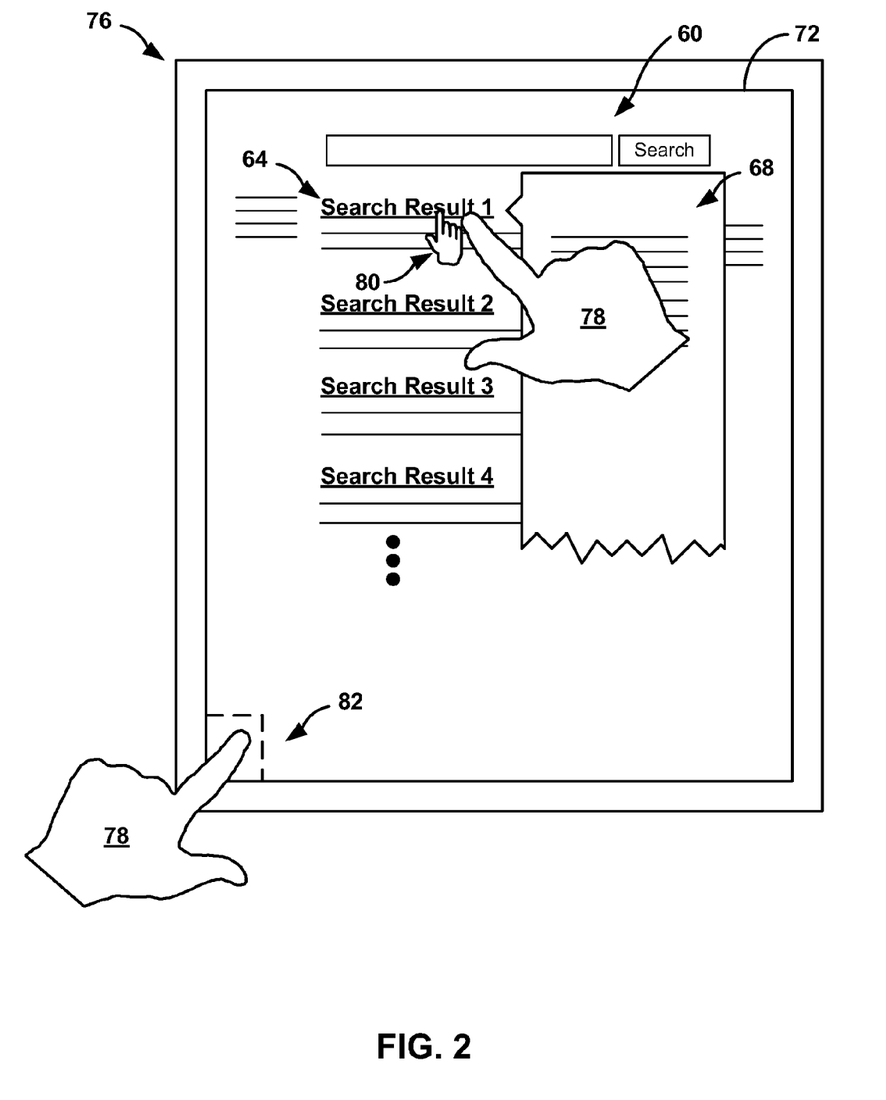
FIG. 2 is a diagram illustrating another example user interface having another user interface element that includes associated hover content, according to one or more aspects of the present disclosure.

FIG. 2 is a diagram illustrating another example UI 60 having a UI element 64 that includes associated hover content 68. According to some aspects of the disclosure, UI 60 is displayed on a touch-sensitive display ("touch screen") 72 of a computing device 76 that is capable of receiving user input from a user 78 (e.g., shown and represented as a user's hands in FIG. 2). For example, user 78 may provide user input by making physical contact with touch screen 72, which allows a user to interact with computing device 76. Computing device 76 may, in some examples, include or be a part of a portable computing device (e.g. mobile phone, netbook, laptop, tablet device, or other portable computing device) or a desktop computer. In the example shown in FIG. 2, UI 60 also includes a designated area 82 for receiving a user input that initiates a hover mode.

In operation, touch screen 72 may generate one or more events (e.g., signals) corresponding to the coordinates of a relative position touched on touch screen 72. Such user input, in the form of physical contact with touch screen 72, may be referred to as a touch gesture. The events generated by touch screen 72 may be transmitted to, and received by another component of computing device 76 (e.g., a processor of computing device as shown and described with respect to FIG. 4). Computing device 76 may then perform a function that corresponds to the user input. For example, if a hyperlink of a web page is displayed at the relative location of the touch gesture, computing device 76 may activate the hyperlink and launch the web page associated with the hyperlink.

In some examples, touch screen 72 is capable of receiving multiple and substantially simultaneous distinct user inputs (e.g., referred to as "multi-touch input"). For example, user 22 may provide a first user input (e.g., a touch gesture) by initially placing a single finger in contact with touch screen 72. The user may then provide a second user input (e.g., another touch gesture) that is distinct from the first user input (e.g., a touch gesture in a different area of touch screen 72). Touch screen 72 may detect and register both the first touch gesture and the second touch gesture while in contact with touch screen 72 and subsequently generate one or more corresponding signals. Each different gesture may correspond to a distinct function in a component of computing device 76. For example, a first touch gesture may perform a first function in a component of computing device 76. A second touch gesture, distinct from the first touch gesture, may perform a second function distinct from the first function. In this manner, the user can use touch gestures to perform functions efficiently on computing device 76.

According to aspects of the disclosure, user 78 may utilize designated area 82 of touch screen 72 to initiate a hover mode by performing a user input, such as a touch gesture, in designated area 82. For example, by convention, computing device 76 typically interprets touch-based contact with touch screen 72 as a mouse down event (e.g., equivalent to actuating or "clicking" a mouse button on a conventional PC, referred to herein as a tap or touch down event), or a scroll event (e.g., equivalent to using a scroll wheel of a mouse to scroll through content on a conventional PC). According to aspects of the disclosure, computing device 76 may interpret user input, such as a touch gesture, in designated area 82 of UI 60 as initiating a hover mode. The hover mode allows user 78 to trigger a UI event, such as displaying hover content 68 associated with UI element 64, without activating UI element 64. For example, hover content 68 may provide graphical information about content associated with UI element 64. Examples of hover content include highlighting or otherwise changing text of UI element 64 to notify the user that UI element 64 can be actuated, displaying a preview, or "pop-up" window having text that describes content associated with UI element 64, displaying a preview window that includes content associated with UI element 64 (e.g., a zoomed out or shrunken version of the content associated with UI element 64), or other hover content.

User 78 may initiate, or enable, a hover mode using designated area 82 in a variety of ways. In one example, user 78 performs a single touch gesture in designated area 82 to enable the hover mode. For example, user 78 may tap touch screen 72 in designated area 82 to initiate a hover mode. With hover mode active, user 78 may perform touch gestures on UI elements 64 to explore the contents of the UI elements 64 without actuating the UI elements 64. In addition, content rendered on touch screen 72 may be pinned in position. To disable hover mode, user 78 may perform another single touch gesture in designated area 82. User 78 is then free to actuate UI elements 64.

In another example, user 78 performs a continuous touch gesture in designated area 82 to enable the hover mode. For example, user 78 maintains contact with touch screen 72 in designated area 82 for as long as user 78 wishes to have hover mode active. With hover mode active, user 78 may perform touch gestures, separate from the touch gesture in designated area 82, to explore UI elements 64 without actuating the UI elements 64. User 78 may disable hover mode by breaking contact with designated area 82.

A user may also provide continuous touch gestures in other sequences to produce different interactions with UI 60. For example, in another example, user 78 may perform a continuous touch gesture in designated area 82 to enable the hover mode. For example, user 78 may maintain contact with touch screen 72 in designated area 82 for as long as user 78 wishes to have hover mode active. With hover mode active, user 78 may perform other touch gestures, separate from the touch gesture in designated area 82, to explore UI elements 64 without activating the UI elements 64. User 78 may then determine that user 78 wants to activate UI element 64. User 78 may activate UI element 64 by maintaining contact with UI element 64 while releasing the first touch gesture in designated area 82 (e.g., breaking contact with touch screen 72). Upon breaking contact with touch screen 72 in designated area 82, computing device 76 may disable hover mode and return to normal operation (e.g., causing a tap event), thereby activating UI element 64.

In another example, user 78 may first perform a touch gesture in UI 60 (e.g., scrolling or touching a UI element 64). User 78 may then perform a second, distinct touch gesture in designated area 82 to initiate the hover mode of interaction. User 78 may maintain contact with touch screen 72 in designated area 82 for as long as user 78 wishes to have hover mode active. With hover mode active, UI 60 may display hover mode content 68 associated with UI elements 64. The user may then release the first touch gesture (e.g., break contact touch screen 72) to remove content 68, and release the second touch gesture to disable hover mode.

In another example, user 78 may first perform a touch gesture in UI 60 (e.g., scrolling or touching a UI element 64). User 78 may then perform a second touch gesture in designated area 82 to initiate the hover mode of interaction. User 78 may maintain contact with touch screen 72 in designated area 82 for as long as user 78 wishes to have hover mode active. With hover mode active, UI 60 may display hover mode content 68 associated with UI elements 64. User 78 may then determine that user 78 wants to activate UI element 64. User 78 may activate UI element 64 by releasing the second touch gesture and disabling hover mode. Upon breaking contact with touch screen 72 in designated area 82, computing device 76 may resume normal operation, thereby activating UI element 64. User 78 may then release the first touch gesture.

According to some aspects of the disclosure, user 78 must provide user input, such as a touch gesture in designated area 82, for a predetermined duration before computing device 76 initiates hover mode. For example, user 78 may have to provide a continuous touch gesture in designated area 82 for one or more seconds (e.g., two seconds, three seconds, or a longer duration) before computing device 76 initializes hover mode. In examples in which a single touch gesture is required for initiating hover mode, user 78 may be required to maintain contact with touch screen 72 for the predetermined duration before computing device 76 initiates hover mode. In examples in which a continuous touch gesture is required for initiating a hover mode of interaction, user 78 may experience a delay in initiating the hover mode while maintaining contact with touch screen 72.

According to some aspects of the disclosure, while in hover mode, computing device 76 may hold in position, or "pin" rendered content on touch screen 72. For example, user 78 may provide user input in designated area 82 to initialize hover mode. With hover mode activated, computing device 76 may temporarily disable the ability to scroll or reposition content rendered on touch screen 72, or actuate UI elements, such as UI element 64.

Computing device 76, while in hover mode, may display hover content 68 associated with a UI element that is perceptually closest to the physical location of the user input (e.g., touch gesture) on the touch screen 72. For example, user 78 may use designated area 82 to initiate hover mode. User 78 may then perform a touch gesture on or near a UI element, such as UI element 64, displayed on touch screen 72. In response, computing device 76 may display hover content 68 associated with the UI element that is perceptually closest to the touch gesture user interface selection.

In some examples, computing device 76 may interpret user input, such as touch gestures, a predefined distance above, below, or to a side of the physical location of the user input. For example, computing device 76 may provide a mode of interaction in which user 78 points to a UI element, such as UI element 64, rather than requiring user 78 to touch or "cover" UI element 64. Such a mode of interaction may allow user 78 to initiate display of hover content 68 without obscuring the UI element 64 associated with the hover content 68. If the user 78 does not provide a touch gesture directly on the UI element displayed on touch screen 72, computing device 76 may include an ability to virtually move, or "snap" the touch gesture user interface selection to the perceptually closest UI element.

In addition, computing device 76 may display hover content 68 a predefined distance above, below, or to a side of the physical location of the user input. For example, computing device 76 may transpose hover content 68 a certain distance above, below, or to a side of the physical location of the user input. Transposing hover content 68 a certain distance from the location of the user input may help to ensure that the act of providing the user input (e.g., performing a touch gesture on touch screen 72) does not obscure the hover content 68.

In some examples, computing device 76 provides notification to user 78 when a mode of interaction has changed. For example, computing device 76 may signal to user 78 that a hover mode is active by displaying a graphical symbol or character on touch screen 72 (e.g., a traditional arrow style mouse cursor, a pointing finger such as cursor 80, or an alternative symbol or character). In another example, computing device 76 may alter some or all of the content rendered on touch screen 72 when a mode of interaction has changed. For example, computing device 76 may fade some or all of the content rendered on touch screen 72. Additionally or alternatively, computing device 76 may provide haptic feedback (e.g., vibration) to notify user 78 that a mode of interaction has changed.

According to some aspects of the disclosure, computing device 76 provides an indication of designated area 82 for initiating hover mode to user 78. For example, in the example shown in FIG. 2, computing device 76 may display a graphical symbol, character, colored area, pulsing or flashing light, or other indication, in designated area 82 to indicate to user 78 that designated area 82 is available to initiate hover mode. In some examples, computing device 76 may only provide the indication when touch screen 72 is displaying UI elements that have associated hover content, such as UI element 64 and hover content 68. If user 78 navigates to a UI that does not include UI elements having hover content, the indication may disappear.

In the non-limiting example shown in FIG. 2, designated area 82 is depicted in the lower left corner of touch screen 72. However, in other examples, designated area 82 may be positioned in other areas of touch screen 72 (e.g., lower right corner, upper right or upper left corners, along a side of touch screen 72, or other areas of touch screen 72). For example, the position of designated area 82 may be selected according to ergonomic considerations, and may vary depending on the configuration of the computing device 76. In examples in which computing device 76 is a mobile or handheld device, a thumb of user 78 may naturally be positioned in the lower left or lower right corners of touch screen 72 when user 78 is gripping computing device 76.

Figure 3A:
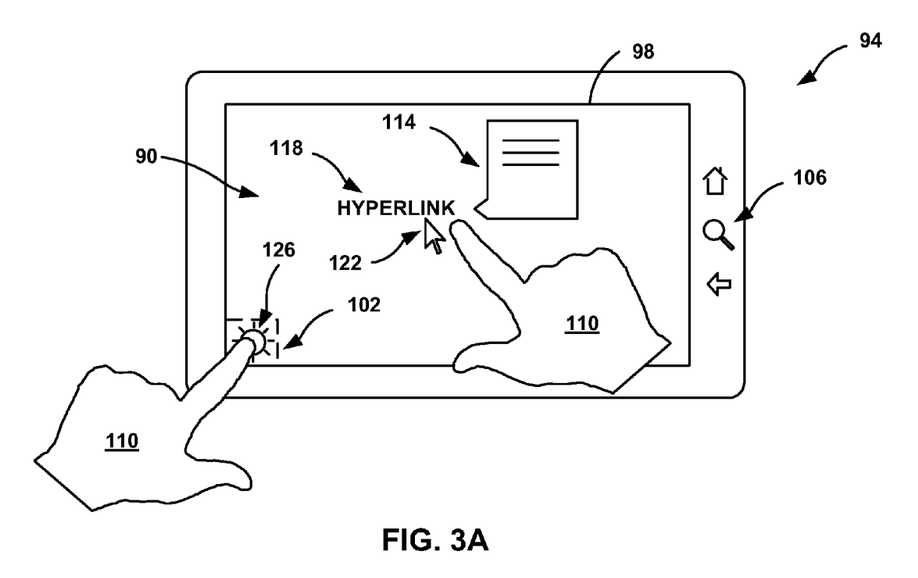
FIG. 3A is a diagram illustrating an example user interface of a computing device having a touch screen with a designated area for receiving user input that initiates a "hover" mode of interaction, according to one or more aspects of the present disclosure.
Figure 3B:
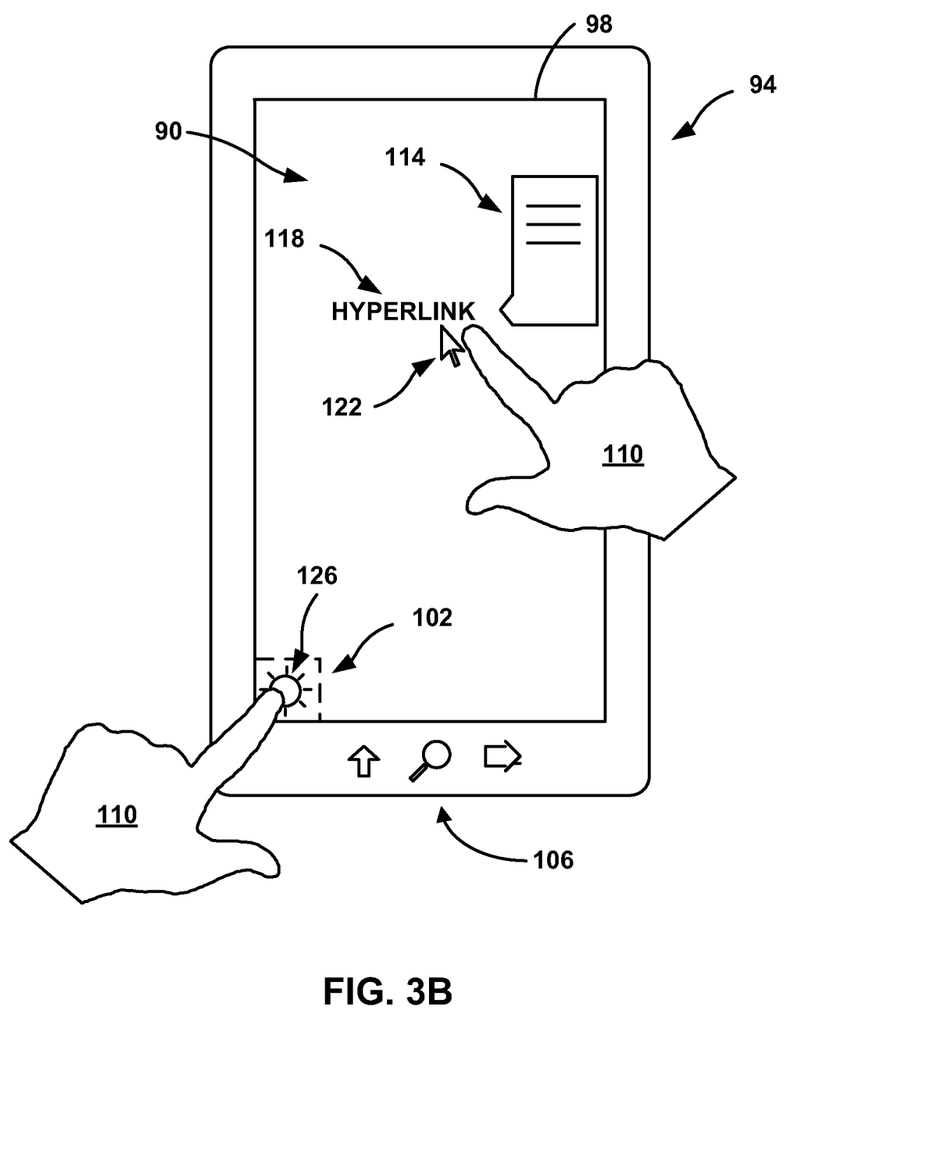
FIG. 3B is a diagram illustrating the user interface and computing device shown in FIG. 3A that has been rotated 90 degrees, according to one or more aspects of the present disclosure.

In some examples, as described in greater detail with respect to FIGS. 3A and 3B, the location of designated area 82 may change according to an orientation of computing device 76. For example, in examples in which computing device 76 is a handheld or portable computing device, computing device 76 may dynamically change the location of designated area 82 such that designated area 82 remains in the lower left portion of touch screen 72, even if touch screen 72 is rotated with respect to user 78. Computing device may implement a variety of components (e.g., a gyroscope, an accelerometer, or other components) to assist in determining the appropriate location for designated area 82.

Additionally or alternatively, computing device 76 may allow user to select a preferred location of designated area 82. For example, in examples in which computing device 76 is a handheld or portable computing device, a right handed user 78 may wish to have designated area 82 positioned on an opposite side of touch screen 72 than a left-handed user 78. Alternatively, user 78 may prefer designated area 82 to be positioned on the relative top of touch screen 72, rather than on the relative bottom of touch screen 72. Accordingly, computing device 76 may provide a function that allows user 78 to initially select or subsequently change a preferred location for designated area 82.

In the non-limiting example show in FIG. 2, hover mode is described as being initiated with user input, such as a touch gesture, in designated area 82. In other examples, however, computing device 76 may initiate a hover mode with a variety of other user inputs, or a combination of user inputs. For example, rather than providing user input in designated area 82, computing device 76 and touch screen 72 may include a dedicated button (e.g., a "soft" button located and designated in a predefined area of touch screen 72, or a hardware button on computing device 76) for initiating a hover mode. Alternatively or additionally, user interface 60 may include a menu function that allows a user to select or deselect a hover mode. In other examples, computing device 76 may implement a gyroscope, an accelerometer, or a variety of other user input devices to initiate a hover mode.

Computing device 76 may include additional components or features not shown in FIG. 2 for purposes of clarity. For example, computing device 76 may also include a microphone and a speaker, in examples where computing device 76 is configured to make or receive video or telephone calls. Moreover, the components and features of computing device 76 shown in FIG. 2 may not be necessary in every example of computing device 76. For example, certain features described with respect to computing device 76, such as providing a notification to user 78 when a mode of interaction has changed or providing an indication of designated area 82, may not be included in every example of computing device 76.

In the non-limiting example shown in FIG. 2, user 78 is shown and represented as providing user input via index fingers of two hands. It should be understood, however, that user 78 can provide user input, such as a touch gesture, in ways other than the manner represented in FIG. 2. For example, user 78 may provide a first touch gesture in designated area 82 with a thumb and a second touch gesture with a finger of the same hand. In another example in which computing device 76 is a portable computing device 76, user 78 may grasp computing device 76 in one hand and provide a first touch gesture in designated area 82 with the thumb of the grasping hand, while providing a second touch gesture with a finger of the non-grasping hand. Other ways of providing touch gestures are also possible.

FIG. 3A is a diagram illustrating an example UI 90 of a computing device 94 having a touch screen 98 with a designated area 102 for receiving user input that initiates a hover mode. According to some aspects of the disclosure, computing device 94 may be configured similarly to or the same as computing device 76 shown in FIG. 2 or computing device 36 shown in FIG. 1. In the example shown in FIG. 3A, computing device 94 also includes a plurality of touch-sensitive buttons 106 that can be actuated by a user 110.

In the non-limiting example shown in FIG. 3A, designated area 102 is positioned in a lower left area of UI 90, although as described with respect to FIG. 2, designated area 102 may be positioned in other areas of touch screen 98. According to aspects of the disclosure, user 110 may utilize designated area 102 to initiate a hover mode. For example, user 110 may utilize designated area 102 of touch screen 98 to initiate a hover mode by performing a user input, such as a touch gesture, in designated area 102. The hover mode allows user 110 to trigger a UI event, such as displaying hover content 114 associated with a UI element 118, without activating the UI element 118.

In some examples, computing device 94 may interpret user input, such as a touch gesture, a predefined distance above, below, or to a side of the physical location of the user input. For example, as shown in FIG. 3A, user 110 is performing a touch gesture at a location in UI 90, associated with the physical location of the user input on touch screen 98, slightly below UI element 118 with hover mode active (e.g., activated by touch gesture in designated area 102). Computing device 94, however, interprets the touch gesture as being associated with UI element 118 above the touch gesture and initiates a UI event that includes displaying hover content 114. In this way, user 110 is not necessarily required to provide user input directly on UI element 118, thereby allowing user 110 to initiate display of hover content 114 without obscuring the UI element 118.

In addition, computing device 94 may display hover content 114 a predefined distance above, below, or to a side of a location in UI associated with the physical location of the user input. In the example shown in FIG. 3A, computing device 94 displays hover content 114 to the right and above UI element 118. In doing so, user 110 does not obscure hover content 114 by performing the touch gesture on UI element 118.

In the non-limiting example shown in FIG. 3A, computing device 94 notifies user 110 that a hover mode is active by displaying a cursor 122 on touch screen 98. In other examples, computing device 94 may notify user 110 that a hover mode is active by displaying other a graphical symbols or characters on touch screen 98. In some examples, cursor 122 may change position according to the physical location of the user's touch gesture. For example, if user 110 explores a UI element other than UI element 118 in a different location on touch screen 98 with a touch gesture, computing device 98 displays cursor 122 near the touch gesture.

According to some aspects of the disclosure, computing device 94 provides an indication 126 of designated area 102 for initiating hover mode to user 110. In the example shown in FIG. 3A, indication 126 is a light (e.g., a pulsing colored light) that indicates to user 110 that hover mode may be initiated using designated area 102. In other examples, computing device 94 may provide a different indication 126 (e.g., a symbol or icon, such as a pointing finger icon). In some examples, computing device 94 only provides indication 126 when touch screen 98 is displaying UI elements that have associated hover content, such as UI element 118 and hover content 114. If user 110 navigates to a UI that does not include UI elements having hover content, indication 126 may disappear.

FIG. 3B is a diagram illustrating UI 90 and computing device 94 of FIG. 3A that has been rotated 90 degrees. According to some examples of the disclosure, the location of designated area 102 may change according to an orientation of computing device 94 with respect to user 110. For example, computing device 94 may virtually reposition the location of designated area 102 so that the position of designated area 102 remains the same with respect to user 110, even if the relative orientation of computing device 94 with respect to user 110 is altered. In the example shown in FIG. 3B, computing device 94 positions designated area 102 in the lower left portion (e.g., with respect to user 110) of touch screen 98, regardless of the orientation of computing device 94 with respect to user 110. Computing device 94 may implement a variety of hardware or software components (e.g., a gyroscope, an accelerometer, or other hardware or software components) to assist in determining the appropriate location for designated area 82.

Computing device 94, as shown in FIG. 3A and FIG. 3B, may include additional components or features not shown in FIG. 3A and FIG. 3B for purposes of clarity. For example, computing device 94 may also include a microphone, speaker, keyboard, or a variety of other devices. Moreover, the components and features described with respect to computing device 96 may not be necessary in every example of computing device 96. For example, certain features described with respect to computing device 96, such as providing a notification to user 110 when a mode of interaction has changed or providing an indication 126 of designated area 102, may not be included in every example of computing device 96.

Figure 4:
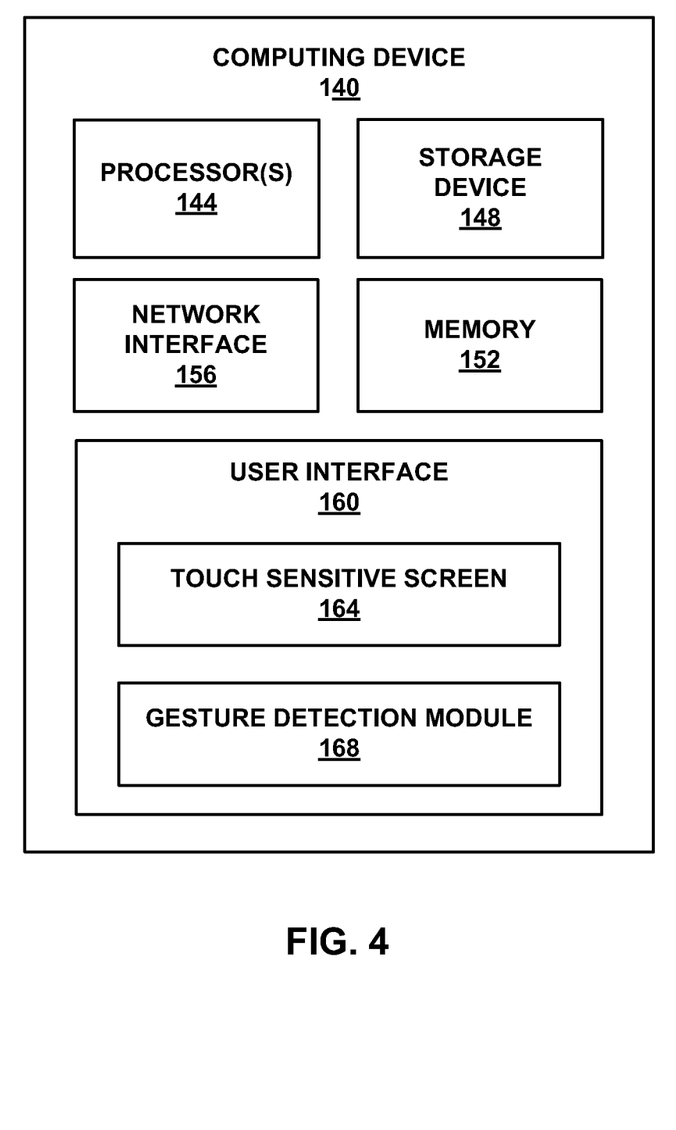
FIG. 4 is a diagram of an example computing device that may be configured to receive user input for initiating a "hover" mode of interaction, according to one or more aspects of the present disclosure.

FIG. 4 is a diagram of a computing device 140 that may be configured to receive user input for initiating a hover mode of interaction, according to aspects of the present disclosure. In some examples, computing device 140 may be configured similar to, or the same as, computing device 36 shown in FIG. 1, computing device 76 as shown in FIG. 2, or computing device 94 as shown in FIGS. 3A and 3B. In the example shown in FIG. 4, computing device 140 includes one or more processors 144, a storage device 148, memory 152, and a network interface 156. In addition, computing device 140 includes a user interface 160 having a touch-sensitive screen 164 and gesture detection module 168.

Computing device 140 may include additional components not shown in FIG. 4 for purposes of clarity. For example, computing device 140 may also include a microphone and speaker, in examples where device 140 is capable of making telephone calls. Computing device 140 may also include a battery that provides power to the components of computing device 140. Computing device 140 may also include other user interface components, such as a keypad, trackball, mouse, or other such user interfaces that allow the user to interact with computing device 140. Moreover, the components of computing device 140 shown in FIG. 4 may not be necessary in every example of computing device 140.

Processors 144 may be configured to implement functionality and/or process instructions for execution within computing device 140. Processors 144 may be capable of processing instructions stored in memory 152 or instructions stored on storage device 148. Processors 144 may include any one or more of a microprocessor, a controller, a digital signal processor (DSP), an application specific integrated circuit (ASIC), a field-programmable gate array (FPGA), or equivalent discrete or integrated logic circuitry. Additionally, the functions attributed to processor 144, in this disclosure, may be embodied as software, firmware, hardware or any combination thereof.

Storage device 148 may include one or more computer-readable storage media. Storage device 148 may include non-volatile storage elements. Examples of such non-volatile storage elements may include magnetic hard discs, optical discs, floppy discs, flash memories, or forms of electrically programmable memories (EPROM) or electrically erasable and programmable (EEPROM) memories. In addition, storage device 148 may, in some examples, be considered a non-transitory storage medium. The term "non-transitory" may indicate that the storage medium is not embodied in a carrier wave or a propagated signal. However, the term "non-transitory" should not be interpreted to mean that storage device 148 is non-movable. As one example, storage device 148 may be removed from computing device 140, and moved to another device. As another example, a storage device, substantially similar to storage device 148, may be inserted into computing device 140. In some examples, storage device 148 may be configured to store larger amounts of information than memory 152. In certain examples, a non-transitory storage medium may store data that can, over time, change (e.g., in RAM or cache).

Memory 152 may be configured to store information within computing device 140 during operation. Memory 152 may, in some examples, be described as a computer-readable storage medium. Memory 152 may be described as a volatile memory, meaning that memory 152 does not maintain stored contents when the computer is turned off. Examples of volatile memories include random access memories (RAM), dynamic random access memories (DRAM), static random access memories (SRAM), and other forms of volatile memories known in the art. In some examples, memory 152 may be used to store program instructions for execution by processors 144.

Computing device 140 may utilize network interface 156 to communicate with external devices via one or more networks, such as one or more wireless networks. Network interface 156 may be a network interface card, such as an Ethernet card, an optical transceiver, a radio frequency transceiver, or any other type of device that can send and receive information. Examples of such network interfaces may include Bluetooth®, 3G and WiFi® radios in mobile computing devices as well as USB. Examples of such wireless networks may include WiFi®, Bluetooth®, and 3G. In some examples, computing device 140 may utilize network interface 156 to wirelessly communicate with an external device (not shown) such as a server, mobile phone, or other networked computing device.

User interface ("UI") 160 allows a user of computing device 140 to interact with computing device 140. UI 160 may generate a graphical user interface ("GUI") that allows a user to initiate commands. For example, according to some aspects of the disclosure, UI 160 generates a GUI that is displayed on touch sensitive screen ("touch screen") 164. The GUI may include one or more touch sensitive UI elements. For example, a user may be able to interact with computing device 140 and initiate a command by touching one or more of the touch sensitive UI elements displayed on touch screen 164.

Touch screen 164 may comprise a variety of display devices such as a liquid crystal display (LCD), an e-ink display, a cathode ray tube (CRT), a plasma display, an organic light emitting diode (OLED) display, or another type of display device. Some techniques employed in these devices for detecting the location of a touch include mechanical buttons, crossed beams of infra red light, acoustic surface waves, capacitive sensing, and resistive sensing techniques. Touch screen 164 may, in one example, generate one or more signals corresponding to the coordinates of a position touched on touch screen 164. These signals may then be provided as information to components of computing device 140, such as processors 144.

According to some aspects of the disclosure, touch screen 164 is responsive to more than one distinct touch on touch screen 164 (e.g., referred to as a "multi-touch screen"). For example, a user may perform a touch gesture by initially placing a finger in contact with touch screen 164 at a first location. The user may then perform a second touch gesture by placing another finger in contact with touch screen 164 at a second location. Touch screen 164 may independently detect both touch gestures and generate corresponding signals. Each different gesture may correspond to a distinct function in a component of computing device 140. For example, the first touch gesture may perform a first function in a component of computing device 140. The second touch gesture, distinct from the first touch gesture, may perform a second function distinct from the first function. In this manner, user can use touch gestures to perform a variety of functions on computing device 140.

According some aspects of the disclosure, gesture detection module 168 aids in providing a hover mode of interaction with computing device 140, which allows a user to interact with a UI element displayed on touch screen 164 of computing device 140 without activating the UI element. In some examples, gesture detection module 168 detects a first user input, such as a touch gesture in a designated area of touch screen 164, and initiates the hover mode. After gesture detection module 168 has initiated the hover mode, the user can provide another user input, such as a second touch gesture separate from the first user input, on a UI element to explore the UI element without activating the UI element.

In order to provide a hover mode of interaction, gesture detection module 168 may communicate with an application (e.g., an application being executed by processor 144) responsible for generating one or more UI elements displayed on touch screen 164 of computing device 140. For example, gesture detection module 164 may generate signals associated with touch gestures performed on touch screen 164, and communicate those signals to an application displaying one or more UI elements (e.g., a web browser or other application having one or more UI elements) on touch screen 164. Upon receiving the signals from gesture detection module 168, the application can generate the appropriate UI response.

According to some aspects, gesture detection module 164 communicates a signal to an application indicating that a user has performed a first touch gesture (e.g., such as a touch gesture in designated area 82 shown in FIG. 2) to activate a hover mode of interaction. Gesture detection module 164 also communicates a signal to the application representing the relative position of a second touch gesture (e.g., such as the touch gesture being performed on UI element 64 shown in FIG. 2). Upon receiving the signals from the gesture detection module 164, the application can identify that a hover mode of interaction is active and interpret the relative position of the second touch gesture to generate the hover content associated with the UI element being displayed on the touch screen 164 in the relative position of the second touch gesture. In some examples, the application may also identify the perceptually closest UI element displayed on the touch screen 164 based on the relative position of the second touch gesture.

Gesture detection module 168 may initiate a hover mode in a variety of ways. In one example, gesture detection module 168 enables a hover mode by identifying a single touch gesture in a designated area of touch screen 164. For example, gesture detection module 168 receives input from touch screen 164 corresponding to a single touch, or "tap," in a designated area of touch screen 164, and initiates a hover mode based on the input. Gesture detection module 168 may disable hover mode upon identifying a second single touch gesture in the designated area.

In another example, gesture detection module 168 enables the hover mode by identifying a continuous touch gestured in a designated area of touch screen 164. For example, gesture detection module 168 receives input from touch screen 164 corresponding to a continuous touch-and-hold gesture (e.g., resulting from user maintaining contact with touch screen 164) in a designated area of touch screen 164, and initiates hover mode based on the input. In some examples, gesture detection module 168 does not initiate hover mode until a user has maintained contact with touch screen 164 for a predetermined duration. For example, gesture detection module 168 may require a continuous touch gesture input from touch screen 164 for one or more seconds before initiating hover mode. Gesture detection module 168 may disable hover mode upon identifying that user has broken contact with touch screen 164 in the designated area.

According to some aspects, gesture detection module 168 may disable hover mode while a user is exploring a UI element and thereby activate the UI element. For example, gesture detection module 168 may initiate hover mode upon receiving an input from touch screen 164 corresponding to a continuous touch gesture in a designated area of touch screen 164. Accordingly, computing device 140 allows a user to interact with one or more UI elements displayed on touch screen 164 without activating the UI elements. Gesture detection module 168 may then receive a second input from touch screen 164 corresponding to a second touch gesture on a UI element being displayed on touch screen 164. While receiving the second input, user may break contact with touch screen 164, which causes touch screen 164 to stop sending the first input to gesture detection module 168. Gesture detection module 168 may then disable hover mode, which causes the second input to activate the UI element.

Gesture detection module 168 may cause content displayed on touch screen 164 to be held in position, or "pinned" in place. For example, upon initiating hover mode, gesture detection module 168 may temporarily disable the ability to scroll or reposition content rendered on touch screen 164 or actuate UI elements displayed on touch screen 164. While in hover mode, gesture detection module 168 may identify a UI element that is perceptually closest to a user's touch gesture, and cause computing device 140 to display hover content associated with the closest UI element. In addition, gesture detection module 168 may cause computing device 140 to interpret touch gestures a predefined distance above, below, or to a side of the physical location of a touch gesture. For example, gesture detection module 168 may cause computing device 140 to display hover content when a user points to a UI element (e.g., with a touch gesture just below, above, or to the side of the UI element), rather than requiring the user to touch the UI element. In this way, gesture detection module 168 provides the ability to virtually move, or "snap" the user's touch gesture to the perceptually closest UI element. In some examples, gesture detection module 168 may also cause computing device 140 to display hover content a predefined distance above, below, or to a side of the physical location of the user input. For example, gesture detection module 168 may cause computing device 140 to transpose hover content a certain distance above, below, or to a side of the location of the UI element or the physical location of the user input.

According to some aspects of the disclosure, gesture detection module 168 causes computing device 140 to provide notification to a user when a mode of interaction has changed. For example, gesture detection module 168 may cause computing device 140 to indicate that a hover mode is active by displaying a graphical symbol or character on touch screen 164, altering some or all of the content rendered on touch screen 164, providing haptic feedback to the user, or any combination thereof. In some examples, gesture detection module 168 may cause computing device 140 to provide an indication of a designated area on touch screen 164 for initiating hover mode (e.g., displaying a graphical symbol, character, colored area, pulsing or flashing light, or other indication). Gesture detection module 168 may only cause computing device 140 to provide the indication when touch screen 164 is displaying UI elements that have associated hover content.

Gesture detection module 168 may provide a designated area for initiating a hover mode in any area of touch screen 164 (e.g., corners of touch screen 164, along a side of touch screen 164, or other areas of touch screen 164). Gesture detection module 168 may be preprogrammed with the designated area, or may allow a user to select a preferred designated area. According to some aspects of the disclosure, gesture detection module 168 changes the location of the designated area an orientation of computing device 140. For example, gesture detection module 168 may dynamically change the location of the designated area such that the designated area remains in the same position of the screen relative to the user regardless of the orientation of the computing device 140. In order to maintain the position of the designated area with respect to the user, gesture detection module 168 may receive signals from a variety of computing components including, for example, a gyroscope or an accelerometer.

Gesture detection module 168 is descried with respect to FIG. 4 as providing a designated area for receiving a touch gesture to initiate a hover mode. In other examples, however, gesture detection module 168 and computing device 140 may initiate a hover mode with a variety of other user inputs, or a combination of user inputs. For example, gesture detection module 168 may be configured to receive an input from a dedicated button located on computing device 140 for initiating a hover mode. Alternatively or additionally, gesture detection module 168 and computing device 140 may provide a software-based option (e.g., a menu of a UI) that allows a user to select or deselect a hover mode. In other examples, gesture detection module 168 may receive signals from a gyroscope, an accelerometer, or a variety of other user input devices to initiate a hover mode.

In the example shown in FIG. 4, gesture detection module 168 is shown as a separate module that is incorporated in UI 160. In other examples, however, the functions ascribed to gesture detection module 168 may be carried out by other components of computing device 140, such as processors 144 and memory 152. Moreover, the functions ascribed to gesture detection module 168 may be carried out by implementing software, firmware, hardware or any combination thereof. For example, gesture detection module 168 may include any one or more of a microprocessor, a controller, a digital signal processor (DSP), an application specific integrated circuit (ASIC), a field-programmable gate array (FPGA), or equivalent discrete or integrated logic circuitry.

Figure 5:
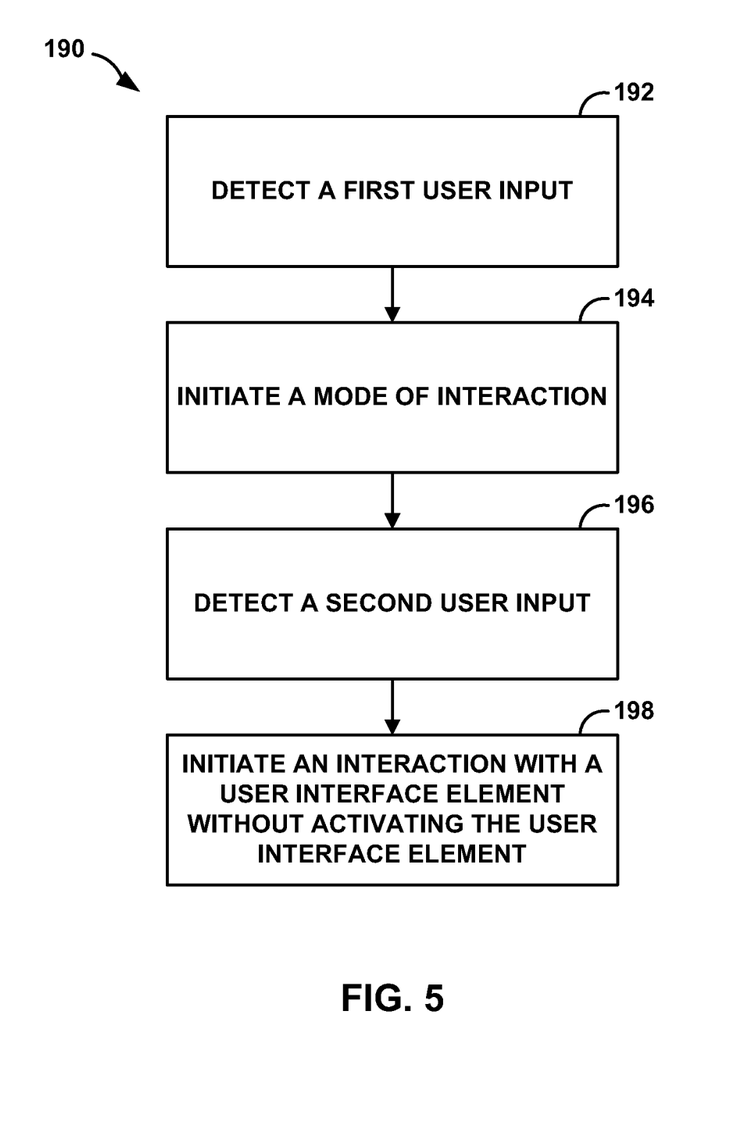
FIG. 5 is a flow chart illustrating an example method for providing a hover functionality in a device having a touch screen, according to one or more aspects of the present disclosure.

FIG. 5 is a flow chart illustrating a method 190 for providing hover functionality in a device having a touch screen, according to aspects of the present disclosure. Although described with respect to computing device 140 of FIG. 4 for purposes of example, it should be understood that the method 90 of FIG. 5 may be performed by a variety of other computing devices or processing units. For example, the method 90 of FIG. 5 may also be carried out by computing device computing device 36 shown in FIG. 1, computing device 76 shown in FIG. 2, or computing device 94 shown in FIGS. 3A and 3B.

According to the example shown in FIG. 5, computing device 140 initially detects a first user input to provide hover functionality (192). In some examples, computing device 140 detects a first touch gesture, which is performed by a user by contacting touch screen 164 of computing device 140. Computing device 140 may reserve a designated area on touch screen 164 for receiving the first touch gesture. For example, as shown in FIG. 2 and FIGS. 3A and 3B, a designated area may be positioned in a corner of touch screen 164. The first user input may be a single touch gesture, or may be a continuous touch gesture.

Computing device 140 responds to the first user input by initiating a hover mode of interaction (194). For example, a hover mode allows a user to interact with one or more UI elements displayed on touch screen 164 without activating the UI elements. Examples of hover content and functions associated with UI elements include highlighting or otherwise changing text of the UI element to notify a user that the element can be activated, initializing a preview window that includes content associated with the UI element, or initializing new content, such as a "tool tip" window to be displayed.

After computing device 140 has initiated hover mode, computing device 140 may detect a second user input that is distinct from the first user input (196). For example, touch screen 164 may be a multi-touch screen that is capable of concurrently receiving and identifying more than one touch gesture. According to some aspects of the disclosure, computing device 140 may receive a second touch gesture that is distinct from the first touch gesture on a UI element that includes hover content displayed on touch screen 164.

Upon detecting the second user input, computing device 140 triggers an interaction with the UI element without activating the UI element (198). For example, computing device 140 provides hover content associated with the UI element without activating the UI element. According to some aspects of the disclosure, a user maintains the first user input while performing the second user input to interact with the UI element without activating the UI element.

It should be understood that aspects of the disclosure relate generally to detecting a first user input, detecting a second user input, and initiating a mode of interaction based on the first user input, and second user input initiating an interaction with a user interface element without activating the user interface element. That is, method 190 is provided as merely one example, and the steps described and represented in FIG. 5 may be carried out other orders. For example, computing device 140 may initially detect the second user input on a UI element. Computing device 140 may then detect the first user input and initiate a hover mode of interaction. In addition, certain steps of method 190 may be carried out concurrently. For example, computing device 140 may initially detect the first user input and initiate the hover mode of interaction, and while detecting the first user input, detect the second user input that is distinct from the second user input. Alternatively, computing device 140 may initially detect the second user input on a UI element, and while detecting the second user input, detect the first user input and initiate the hover mode of interaction.

In one or more examples, the functions described may be implemented in hardware, software, firmware, or any combination thereof. If implemented in software, the functions may be stored on or transmitted over as one or more instructions or code on a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transient media, but are instead directed to non-transient, tangible storage media. Disk and disc, as used herein, includes compact disc (CD), laser disc, optical disc, digital versatile disc (DVD), floppy disk and Blu-Ray disc where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various aspects of the disclosure have been described. These and other aspects and examples are within the scope of the following claims.

The invention claimed is:

1. A method comprising:
   outputting, by a computing device, for display at a touch screen, a graphical user interface that includes at least one user interface element displayed within a first area of the touch screen;
   receiving, by the computing device, an indication of a first gesture, wherein:
      the first gesture is entered within a second area of the touch screen,
      the second area is different than the first area, and
      the first gesture comprises contact with the touch screen within the second area;
   responsive to receiving the indication of the first gesture and while the contact with the touch screen within the second area is maintained:
      initiating, by the computing device, a hover mod, associated with the graphical user interface, in which graphical information associated with the at least one user interface element is displayed in the graphical user interface without activating the at least one user interface element; and
      after initiating the hover mode, receiving by the computing device, an indication of a second gesture, wherein the second gesture is entered within the first area of the touch screen and is distinct from the first gesture; and responsive to receiving the indication of the second gesture and while operating in the hover mode, outputting, by the computing device for display at the touch screen, the graphical information associated with the at least one user interface element without activating the at least one user interface element.

2. The method of claim 1, wherein the second area corresponds to a predefined area of the graphical user interface.

3. The method of claim 2, wherein the predefined area of the graphical user interface comprises a corner of the graphical user interface.

4. The method of claim 2, further comprising determining the predefined area according to a physical orientation of the touch screen.

5. The method of claim 2, further comprising determining the predefined area according to a selection of a user.

6. The method of claim 2, further comprising outputting, for display at the touch screen, a graphical indication of the predefined area.

7. The method of claim 1, further comprising:
identifying the at least one user interface element by determining that the at least one user interface element is displayed within the first area of the touch screen.

8. The method of claim 7, wherein identifying the at least one user interface element by determining that the at least one user interface element is a perceptually closest user interface element nearest to the first area of the touch screen based.

9. The method of claim 1, further comprising indicating that the hover mode is active in response to initiating the hover mode.

10. The method of claim 1, wherein the graphical information associated with the at least one user interface element comprises at least one of an alteration in appearance of the at least one user interface element and a graphical pop-up window that provides information about content associated with the at least one user interface element.

11. The method of claim 1, wherein initiating the hover mode comprises initiating the hover mode in response to determining that the contact of the first gesture is maintained for a predetermined duration.

12. The method of claim 1, further comprising:
upon termination of the first gesture, terminating the hover mode with the at least one user interface element.

13. The method of claim 1, further comprising:
upon termination of the first gesture, activating the at least one user interface element.

14. The method of claim 1, wherein initiating the hover mode comprises pinning content being output for display in the graphical user interface, such that the second gesture does not cause movement of the content in the graphical user interface.

15. The method of claim 1, wherein outputting the graphical information associated with the at least one user interface element comprises outputting the graphical information a predefined distance from the first area of the touch screen.

16. A non-transitory computer-readable storage medium encoded with instructions for causing one or more programmable processors to perform operations comprising:

outputting, for display at a touch screen, a graphical user interface that includes at least one user interface element displayed within a first area of the touch screen;
receiving an indication of a first gesture, wherein:
the first gesture is entered within a second area of the touch screen,
the second area is different than the first area, and
the first gesture comprises contact with the touch screen within the second area;
responsive to receiving the indication of the first gesture and while the contact with the touch screen within the second area is maintained:
initiating a hover mod, associated with the graphical user interface, in which graphical information associated with the at least one user interface element is displayed in the graphical user interface without activating the at least one user interface element; and
after initiating the hover mode, receiving an indication of a second gesture, wherein the second gesture is entered within the first area of the touch screen and is distinct from the first gesture; and
responsive to receiving the indication of the second gesture and while operating in the hover mode, outputting, for display at the touch screen the graphical information associated with the at least one user interface element without activating the at least one user interface element.

17. A computing device comprising:
a user interface having a touch-sensitive screen; and
one or more processors configured to:
output, for display at the touch screen, a graphical user interface that includes at least one user interface element displayed within a first area of the touch screen;
receive an indication of a first gesture, wherein:
the first gesture is entered within a second area of the touch screen,
the second area is different from the first area, and
the first gesture comprises contact with the touch screen within the second area;
responsive to receiving the indication of the first gesture and while the contact with the touch screen within the second area is maintained:
initiate a hover mode, associated with the graphical user interface, in which graphical information associated with the at least one user interface element is displayed in the graphical user interface without activating the at least one user interface element; and
after initiating the hover mode, receive an indication of a second gesture, wherein the second gesture is entered within the first area of the touch screen and is distinct from the first gesture; and
responsive to receiving the indication of the second gesture and while operating in the hover mode, output, for display at the touch screen the graphical information associated with the at least one user interface element without activating the at least one user interface element.

* * * * *